(12) United States Patent
Atsuchi et al.

(10) Patent No.: US 10,612,465 B2
(45) Date of Patent: Apr. 7, 2020

(54) PARTICLE SEPARATORS FOR TURBOMACHINES AND METHOD OF OPERATING THE SAME

(71) Applicant: General Electric Company, Schenectady, NY (US)

(72) Inventors: Satoshi Atsuchi, Rexford, NY (US); Erich Alois Krammer, West Chester, OH (US); Corey Bourassa, Mechanicville, NY (US); Byron Andrew Pritchard, Loveland, OH (US); Mehmet Dede, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 773 days.

(21) Appl. No.: 14/940,251

(22) Filed: Nov. 13, 2015

(65) Prior Publication Data
US 2017/0138262 A1 May 18, 2017

(51) Int. Cl.
*F02C 7/052* (2006.01)
*B01D 45/04* (2006.01)
(Continued)

(52) U.S. Cl.
CPC .............. *F02C 7/052* (2013.01); *B01D 45/04* (2013.01); *B01D 45/06* (2013.01); *F02C 7/12* (2013.01);
(Continued)

(58) Field of Classification Search
CPC ... B01D 45/16; F05D 2260/607; F02C 7/052; F02C 7/055; F02C 6/08; F02C 9/18; B64D 2033/0246
See application file for complete search history.

(56) References Cited

U.S. PATENT DOCUMENTS

| | | | | |
|---|---|---|---|---|
| 4,466,239 A | * | 8/1984 | Napoli | F01D 5/082 415/116 |
| 4,500,332 A | * | 2/1985 | Gillingham | B01D 45/06 55/332 |

(Continued)

OTHER PUBLICATIONS

Connors et al., "Gas Turbine Sand and Dust Effects and Protection Methods", SAE Technical Paper 700705, dated Sep. 1970, pp. 12.
(Continued)

*Primary Examiner* — Gerald L Sung
*Assistant Examiner* — Rene D Ford
(74) *Attorney, Agent, or Firm* — Armstrong Teasdale LLP (57) ABSTRACT

A particle separator for a turbomachine includes a first portion including a first end and a second end opposite the first end. The turbomachine includes a first wall and a second wall defining a primary fluid passage. The first wall further defines an auxiliary fluid passage. The first end is coupled to the first wall. The second end extends from the first wall into the at least one primary fluid passage and extends in a direction defined by the fluid flow through the primary fluid passage. The second end and the first wall define a fluid diversion passage coupled in flow communication with the primary fluid passage and the auxiliary fluid passage. The fluid diversion passage is configured to divert fluid from the primary fluid passage to the auxiliary fluid passage in a direction at least partially opposed to the fluid flow through the primary fluid passage.

20 Claims, 8 Drawing Sheets

(51) Int. Cl.
*F02C 7/12* (2006.01)
*B01D 45/06* (2006.01)
*F02C 6/08* (2006.01)

(52) U.S. Cl.
CPC .......... *F02C 6/08* (2013.01); *F05D 2260/202* (2013.01); *F05D 2260/607* (2013.01)

(56) References Cited

U.S. PATENT DOCUMENTS

| | | |
|---|---|---|
| 4,702,071 A | 10/1987 | Jenkins et al. |
| 4,796,429 A * | 1/1989 | Verdouw .................. F02C 6/08 60/751 |
| 4,820,123 A | 4/1989 | Hall |
| 6,308,511 B1 | 10/2001 | Beeck et al. |
| 6,818,034 B2 | 11/2004 | Anderson et al. |
| 6,986,256 B2 | 1/2006 | Yamanaka et al. |
| 7,874,158 B2 | 1/2011 | O'Neill et al. |
| 7,967,554 B2 | 6/2011 | Bremer |
| 8,240,121 B2 | 8/2012 | Hazzard et al. |
| 8,943,791 B2 | 2/2015 | Tibbott et al. |
| 2014/0290254 A1 * | 10/2014 | Manning .................. F01D 9/02 60/752 |
| 2016/0363051 A1 * | 12/2016 | Snyder .................... F02C 7/052 |

OTHER PUBLICATIONS

O. Schneider et al., "Investigations of Dust Separation in the Internal Cooling Air System of Gas Turbines", ASME Turbo Expo 2003, collocated with the 2003 International Joint Power Generation Conference, vol. 5 Paper No. GT2003-38293, pp. 985-992, Jun. 16-19, 2003, Location: Atlanta, Georgia, USA.

Benavides et al., "Eulerian-Eulerian prediction of dilute turbulent gas-particle flow in a backward-facing step", International Journal of Heat and Fluid Flow, vol. 30, Issue: 3, pp. 452-461, Jun. 2009.

* cited by examiner

FIG. 11

PARTICLE SEPARATORS FOR TURBOMACHINES AND METHOD OF OPERATING THE SAME

BACKGROUND

The field of the disclosure relates generally to a gas turbine engine and, more particularly, to a particle separator for turbomachines and method of enhancing particle removal in a turbomachine.

At least some known turbomachines, i.e., gas turbine engines compress air via a plurality of rotatable compressor blades and ignite a fuel-air mixture in a combustor to generate combustion gases that are channeled through rotatable turbine blades via a hot gas path. Such known turbomachines convert thermal energy of the combustion gas stream to mechanical energy used to generate thrust and/or rotate a turbine shaft to power an aircraft. Output of the turbomachine may also be used to power a machine, for example, an electric generator, a compressor, or a pump.

Many of these known turbomachines include internal cooling air circuits for high temperature components. Air is drawn into the turbomachine during operation, channeled through the compressor, and into the cooling air circuits, thereby cooling selective components. Turbomachines frequently encounter conditions in which a high level of sand and/or particulate matter exists, such as deserts and air-polluted regions. When sand and/or particles enter the cooling air circuits, the particles accumulate around small features such as rims, film cooling holes, and turbulators. This accumulation of particles decreases the effectiveness of cooling the high temperature components. Cooling air is prevented from directly contacting heat transfer surfaces of the high temperature components. Additionally, alteration of high temperature component geometry and/or blocking film cooling holes by the particles also decreases the effectiveness of cooling the high temperature components. As a result, the anticipated service life of turbine components may be shortened, thereby resulting in unplanned engine downtime and increased maintenance costs.

BRIEF DESCRIPTION

In one aspect, a particle separator for a turbomachine is provided. The turbomachine includes a first wall and a second wall at least partially defining at least one primary fluid passage. The first wall further defines at least one auxiliary fluid passage. The particle separator includes a first portion including a first end and a second end opposite the first end. The first end is coupled to the first wall. The second end extends from the first wall into the at least one primary fluid passage and extends in a direction at least partially defined by a direction of fluid flow through the at least one primary fluid passage. The second end and the first wall at least partially define at least one fluid diversion passage coupled in flow communication with the at least one primary fluid passage and the at least one auxiliary fluid passage. The at least one fluid diversion passage is configured to divert fluid from the at least one primary fluid passage to the at least one auxiliary fluid passage in a direction at least partially opposed to the direction of fluid flow through the at least one primary fluid passage.

In a further aspect, a turbomachine is provided. The turbomachine includes a compressor, a turbine rotatably coupled to the compressor, and a combustor coupled in flow communication with the compressor and the turbine. The turbomachine further includes a combustor bypass system including a first wall and a second wall at least partially defining at least one primary fluid passage. The first wall further defines at least one auxiliary fluid passage. The turbomachine further includes a particle separator including a first portion. The first portion includes a first end and a second end opposite the first end. The first end is coupled to the first wall. The second end extends from the first wall into the at least one primary fluid passage and extends in a direction at least partially defined by a direction of fluid flow through the at least one primary fluid passage. The second end and the first wall at least partially define at least one fluid diversion passage coupled in flow communication with the at least one primary fluid passage and the at least one auxiliary fluid passage. The at least one fluid diversion passage is configured to divert fluid from the at least one primary fluid passage to the at least one auxiliary fluid passage in a direction that is at least partially opposed to the direction of fluid flow through the at least one primary fluid passage.

In another aspect, a method of enhancing particle removal from a fluid flow in a turbomachine is provided. The turbomachine includes a first wall and a second wall at least partially defining at least one primary fluid passage. The first wall further defines at least one auxiliary fluid passage. The turbomachine further includes a particle separator including a first portion. The first portion includes a first end and a second end opposite the first end. The first end is coupled to the first wall. The second end extends from the first wall into the at least one primary fluid passage and extends in a direction at least partially defined by a direction of fluid flow through the at least one primary fluid passage. The second end and the first wall at least partially define at least one fluid diversion passage. The method includes inducing a fluid flow in the turbomachine. The method also includes establishing primary fluid flow through the at least one primary fluid passage. The method further includes establishing auxiliary fluid flow through the at least one auxiliary fluid passage including diverting at least a portion of the primary fluid flow through the at least one fluid diversion passage. The at least one fluid diversion passage diverts fluid flow from the at least one primary fluid passage to the at least one auxiliary fluid passage in a direction that is at least partially opposed to the direction of fluid flow through the at least one primary fluid passage.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Particle separating devices described herein provide a cost-effective method for reducing sand particles and/or particulate matter within cooling systems of turbomachines. Specifically, in order to reduce particles within the cooling system, the particle separators described herein utilize the difference in inertia between particles and air molecules as a separation mechanism. The particle separator is located over a cooling air extraction hole serving as a particle shield such that particles are restricted from directly entering the cooling passage. Additionally, the particle separator modifies a cross-sectional area of a flow passage, accelerating particle-laden flow therein. Cooling air is routed through a fluid diversion passage within the particle separator. Particle-laden flow has to turn approximately 180° at the fluid diversion passage such that particles with higher inertia are separated and carried downstream. As such, the amount of particles traveling into the cooling passage is substantially decreased. The particle separators described herein offer advantages that include, without limitation, cost effective implementation and retro fit application. Additionally, the particle separators described herein, have a lower weight than many known particle separators, thereby reducing any weight penalties in an aircraft engine retrofit. Moreover, use of the particle separators describe herein maintain the effectiveness of cooling systems within turbomachines by reducing particle accumulation around small features such as rims, film cooling holes, and turbulators, which extends engine component service life, and reduces engine downtime and maintenance costs.

Figure 1:
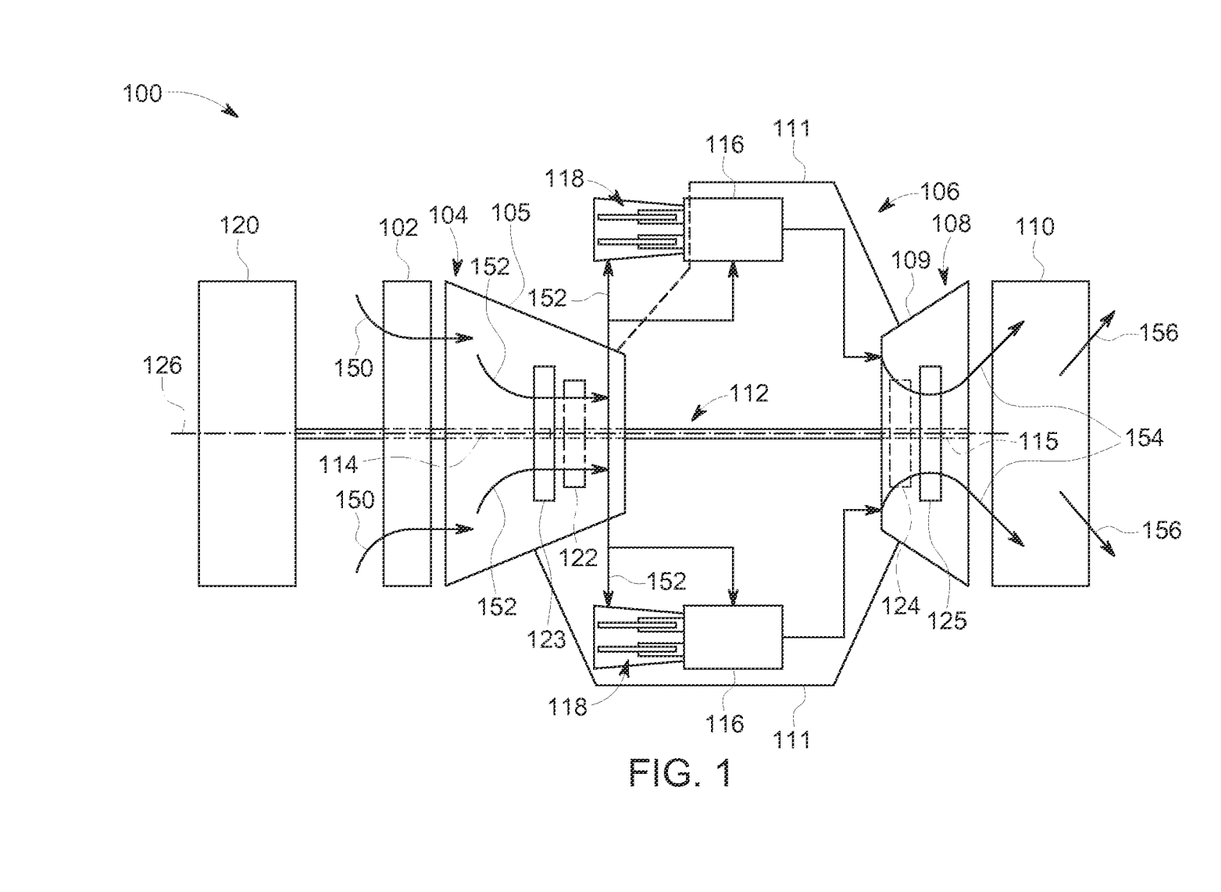
FIG. 1 is a schematic diagram of an exemplary turbomachine, i.e., a turbine engine.

As used herein, the terms "axial" and "axially" refer to directions and orientations which extend substantially parallel to a centerline 126, as shown in FIG. 1, of a turbine engine. Moreover, the terms "radial" and "radially" refer to directions and orientations which extend substantially perpendicular to the centerline of the turbine engine. In addition, as used herein, the terms "circumferential" and "circumferentially" refer to directions and orientations which extend arcuately about the centerline of the turbine engine. The term "fluid," as used herein, includes any medium or material that flows, including, but not limited to air.

FIG. 1 is a schematic view of a rotary machine 100, i.e., a turbomachine, and more specifically, a turbine engine. In the exemplary embodiment, turbine engine 100 is an aircraft engine. Alternatively, turbine engine 100 is any other turbine engine and/or rotary machine, including, without limitation, a gas turbine engine. In the exemplary embodiment, turbine engine 100 includes an air intake section 102, and a compressor section 104 that is coupled downstream from, and in flow communication with, intake section 102. Compressor section 104 is enclosed within a compressor casing 105. A combustor section 106 is coupled downstream from, and in flow communication with, compressor section 104, and a turbine section 108 is coupled downstream from, and in flow communication with, combustor section 106. Turbine engine 100 is enclosed within a turbine casing 109 and includes an exhaust section 110 that is downstream from turbine section 108. A combustor housing 111 extends about combustor section 106 and is coupled to compressor casing 105 and turbine casing 109. Moreover, in the exemplary embodiment, turbine section 108 is coupled to compressor section 104 via a rotor assembly 112 that includes, without limitation, a compressor rotor, or drive shaft 114 and a turbine rotor, or drive shaft 115.

In the exemplary embodiment, combustor section 106 includes a plurality of combustor assemblies, i.e., combustors 116 that are each coupled in flow communication with compressor section 104. Combustor section 106 also includes at least one fuel nozzle assembly 118. Each combustor 116 is in flow communication with at least one fuel nozzle assembly 118. Moreover, in the exemplary embodiment, turbine section 108 and compressor section 104 are rotatably coupled to a fan assembly 120 via drive shaft 114. Alternatively, aircraft engine 100 may be a gas turbine engine and for example, and without limitation, be rotatably coupled to an electrical generator and/or a mechanical drive application, e.g., a pump. In the exemplary embodiment, compressor section 104 includes at least one compressor blade assembly 122, i.e., blade 122 and at least one adjacent stationary vane assembly 123.

Also, in the exemplary embodiment, turbine section 108 includes at least one turbine blade assembly, i.e., blade 125 and at least one adjacent stationary nozzle assembly 124. Each compressor blade assembly 122 and each turbine blade 125 is coupled to rotor assembly 112, or, more specifically, compressor drive shaft 114 and turbine drive shaft 115.

In operation, air intake section 102 channels air 150 towards compressor section 104. Compressor section 104 compresses inlet air 150 to higher pressures and temperatures prior to discharging compressed air 152 towards combustor section 106. Compressed air 152 is channeled to fuel nozzle assembly 118, mixed with fuel (not shown), and burned within each combustor 116 to generate combustion gases 154 that are channeled downstream towards turbine section 108. After impinging turbine blade 125, thermal energy is converted to mechanical rotational energy that is used to drive rotor assembly 112. Turbine section 108 drives compressor section 104 and/or fan assembly 120 via drive shafts 114 and 115, and exhaust gases 156 are discharged through exhaust section 110 to ambient atmosphere.

Figure 2:
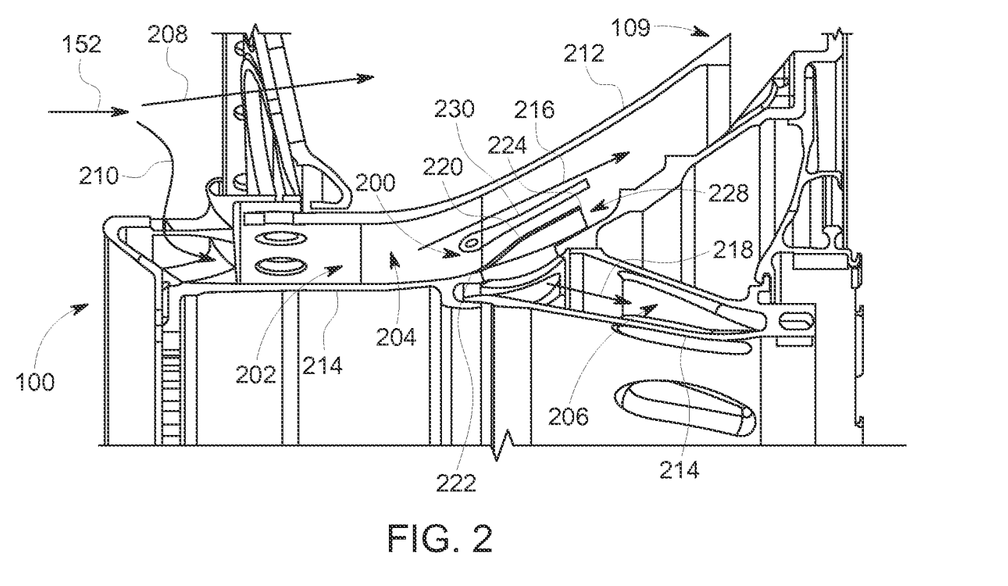
FIG. 2 is a schematic view of an exemplary particle separator that may be used with the turbine engine shown in FIG. 1.

FIG. 2 is a schematic view of an exemplary particle separator 200 that may be used with turbine engine 100. In the exemplary embodiment, turbine engine 100 includes a cooling system 202 that channels cooling air towards an air cooled component such as blade 125 (shown in FIG. 1). Cooling system 202 includes at least one primary fluid passage 204, such as a combustor bypass passage, coupled in flow communication with at least one auxiliary fluid passage 206, such as a cooling air passage. Compressed air 152 discharged from compressor section 104 (shown in FIG. 1) is split into a combustion flow 208 channeled towards combustor section 106 (shown in FIG. 1) and a combustor bypass flow 210 channeled around combustor section 106 (shown in FIG. 1) within primary fluid passage 204.

Combustor bypass flow 210 includes a primary fluid flow 216 through primary fluid passage 204 and an auxiliary fluid flow 218 through auxiliary fluid passage 206. Primary fluid flow 216 flows through primary fluid passage 204 that is defined by a second wall 212 and a first wall 214. First wall 214 further defines auxiliary fluid passage 206. Auxiliary fluid flow 218 flows through auxiliary fluid passage 206 towards the air cooled component.

In the exemplary embodiment, particle separator 200 includes a first portion 220. First portion 220 has a first end 222 and a second end 224 opposite first end 222. First end 222 of first portion 220 is coupled to first wall 214. Second end 224 of first portion 220 extends radially from first wall 214 into primary fluid passage 204 and extends axially from first end 222 of first portion 220 in a direction defined by primary fluid flow 216 through primary fluid passage 204. Second end 224 of first portion 220 and first wall 214 define at least one fluid diversion passage 228. Fluid diversion passage 228 is coupled in flow communication with primary fluid passage 204 and auxiliary fluid passage 206. Fluid diversion passage 228 diverts fluid from primary fluid passage 204 to auxiliary fluid passage 206 in a direction that is opposed to primary fluid flow 216 through primary fluid passage 204.

Furthermore, in the exemplary embodiment, particle separator 200 includes a flow member 230 disposed within primary fluid passage 204 between second wall 212 and first portion 220. Flow member 230 extends axially in a direction defined by primary fluid flow 216 through primary fluid passage 204. Additionally, flow member 230 is disposed within primary fluid passage 204 at a radial distance from first wall 214 within a range from greater than or equal to 20 percent of primary fluid passage radial height to less than or equal to 90 percent of primary fluid passage radial height. Flow member 230 is configured to straighten and/or divide primary fluid flow 216. By creating a more uniform primary fluid flow 216, particle separation efficiency increases at particle separator 200. Flow member 230 is coupled to at least one of first wall 214, second wall 212, and first portion 220. In the exemplary embodiment, flow member 230 has a curvature that is substantially similar to the curvature of second wall 212. In alternative embodiments, flow member 230 may have any other shape that allows particle separator 200 to operate as described herein. In other alternative embodiments, particle separator 200 does not include flow member 230.

Figure 3:
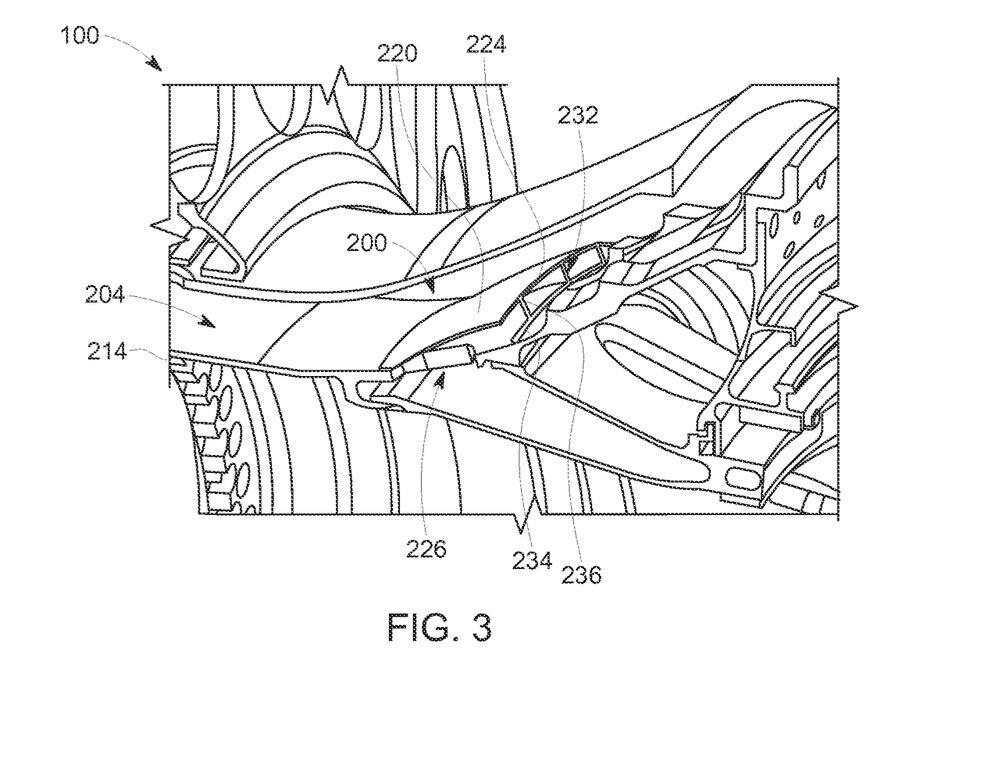
FIG. 3 is a perspective view of the particle separator shown in FIG. 2.

FIG. 3 is a perspective view of particle separator 200 that may be used with turbine engine 100. As described above, particle separator 200 is coupled to first wall 214 at first end 222 of first portion 220. Particle separator 200 further includes a support device 232 including a coupling member 234 and a plurality of support members 236. Support members 236 are coupled to coupling member 234 and extend radially from first wall 214 into primary fluid passage 204. Coupling member 234 is coupled to first wall 214 and support members 236 are coupled to second end 224 of first portion 220.

In the exemplary embodiment, first portion 220 and support device 232 are unitary. In some alternative embodiments, first portion 220, flow member 230, and support device 232 are unitary. In some other alternative embodiments, first portion 220, support device 232, and flow member 230 are separate members that are coupled together. As shown in FIG. 3, particle separator 200 spans substantially circumferentially across primary fluid passage 204 and extends over cooling inlet hole 226. In some alternative embodiments, particle separator 200 is a discrete member that extends over cooling inlet hole 226 only and does not span circumferentially across primary fluid passage 204. Additionally, particle separator 200 is made out of sheet metal or any other suitable material.

Figure 4:
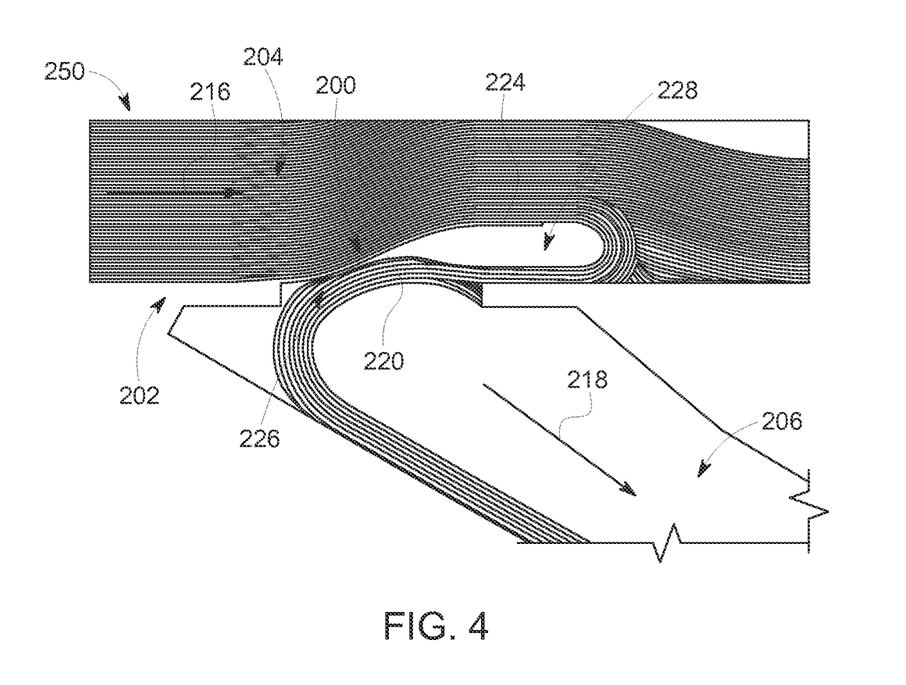
FIG. 4 is a flow characteristic diagram of the particle separator shown in FIG. 2.

FIG. 4 is a flow characteristic diagram 250 of the particle separator 200 as described above. Flow characteristic diagram 250 shows particle trajectories within cooling system 202. Particle-laden primary fluid flow 216 is channeled through primary fluid passage 204. First portion 220 of particle separator 200 extends over cooling inlet hole 226 which reduces direct particle entry into auxiliary fluid passage 206 from particle-laden primary fluid flow 216.

Particle entry into auxiliary fluid passage 206 is also reduced by fluid properties created by particle separator 200. Particles are separated within the flow by the difference in inertia between particles and air molecules. First portion 220 has a ramp-like shape that accelerates particle-laden primary fluid flow 216 in an axial direction by reducing the cross-sectional area of primary fluid passage 204. In the exemplary embodiment, fluid flow is accelerated to approximately a Mach number of 0.1 or higher. Although, it is appreciated that any acceleration that increases inertia of particles will reduce particles in auxiliary fluid passage 206.

When primary fluid flow 216 is accelerated, the particles have a greater amount of inertia than the air molecules. Auxiliary fluid flow 218, which is used for cooling, is diverted from primary fluid flow 216 through fluid diversion passage 228. This diversion forces auxiliary fluid flow 218 to turn approximately 180° around second end 224 of first portion 220 before entering into auxiliary fluid passage 206. The particles having high inertia are removed through centrifugal force and carried further downstream with primary fluid flow 216. The clear area in FIG. 4 around fluid diversion passage 228 shows that particle entry into auxiliary fluid passage 206 is reduced and auxiliary fluid flow 218, which makes the turn at fluid diversion passage 228, contains fewer particles as shown in FIG. 5, discussed below.

Figure 5:
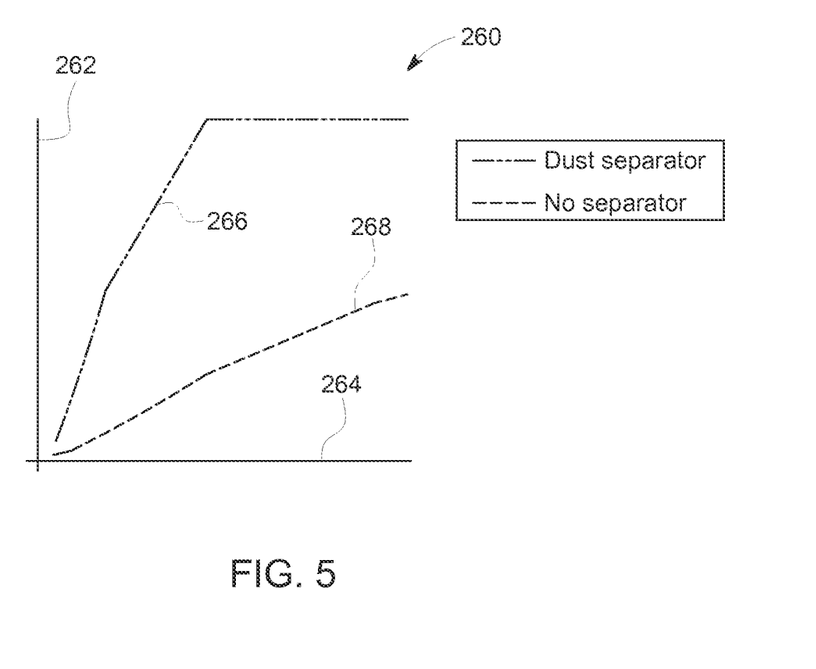
FIG. 5 is a separation graph for the particle separator shown in FIG. 2.

FIG. 5 is a separation graph 260 that includes a y-axis 262 defining efficiency of particle separation from auxiliary fluid flow 218. Graph 260 also includes an x-axis 264 defining particle size. Graph 260 shows two efficiency of particle separation versus particle size curves for auxiliary fluid flow. The uppermost curve 266 is the curve for auxiliary fluid flow 218 with particle separator 200 extending over cooling inlet hole 226. The lowermost curve 268 is the curve for auxiliary fluid flow 218 without particle separator 200 extending over cooling inlet hole 226. The higher the efficiency of particle separation, the cleaner the cooling air for the air cooled component.

Figure 6:
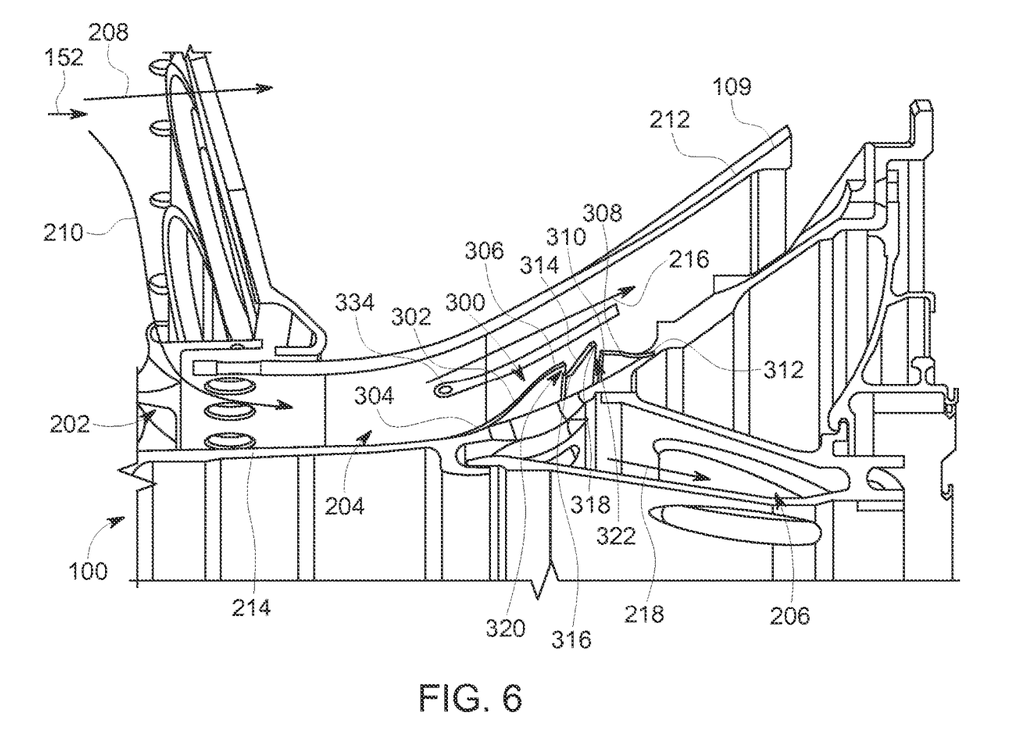
FIG. 6 is a schematic view of an alternative particle separator that may be used with the turbine engine shown in FIG. 1.

FIG. 6 is a schematic view of an alternative particle separator 300 that may be used with turbine engine 100. In this alternative embodiment, turbine engine 100 includes a cooling system 202 that channels cooling air towards the air cooled component as described above in reference to FIG. 2. In this alternative embodiment, particle separator 300 includes a first portion 302, a second portion 308, and at least one third portion 314. First portion 302 has a first end 304 and a second end 306 opposite first end 304. First end 304 of first portion 302 is coupled to first wall 214. Second end 306 of first portion 302 extends radially from first wall 214 into primary fluid passage 204 and extends axially from first end 304 of first portion 302 in a direction defined by primary fluid flow 216 through primary fluid passage 204. Second portion 308 also has a first end 310 and a second end 312 opposite first end 310. First end 310 of second portion 308 extends radially from first wall 214 into primary fluid passage 204. First end 310 of second portion 308 extends axially in a direction opposed to primary fluid flow 216 through primary fluid passage 204. Second end 312 of second portion 308 is coupled to first wall 214. In some alternative embodiments, second portion 308 extends in a direction substantially normal to primary fluid flow 216 through primary fluid passage 204. In some other alternative embodiments, second portion 308 extends in a direction substantially aligned to primary fluid flow 216 through primary fluid passage 204

In this alternative embodiment, particle separator 300 includes third portion 314 between first portion 302 and second portion 308. Third portion 314 has a first end 316 and a second end 318 opposite first end 316. Third portion 314 extends axially in a direction defined by primary fluid flow 216 through primary fluid passage 204. At least one first fluid diversion passage 320 is defined by second end 306 of first portion 302 and first end 316 of third portion 314. At least one second fluid diversion passage 322 is defined by second end 318 of third portion 314 and first end 310 of second portion 308. First and second fluid diversion passages 320, 322 are coupled in flow communication with primary fluid passage 204 and auxiliary fluid passage 206. First and second fluid diversion passages 320, 322 divert fluid from primary fluid passage 204 to auxiliary fluid passage 206 in a direction that is opposed to primary fluid flow 216 through primary fluid passage 204.

Also, in this alternative embodiment, first portion 302, second portion 308, and third portion 314 are shown as substantially "S" shaped. For example, first end 316 of third portion 314 has a local curvature radius (first curve in the "S") greater than or equal to 10 percent of third portion 314 axial length, and second end 318 of third portion 314 has a local curvature radius (second curve in the "S") greater than or equal to 20 percent of third portion 314 axial length. Moreover, for example, second end 318 of third portion 314 has a flap angle (end angle curved either towards first wall 214 or second wall 212) within a range from less than or equal to 10 degrees into second wall 212 (such that end angle curves toward second wall 212) to less than or equal to 60 degrees into first wall 214 (such that end angle curves towards first wall 214). The flap angle also has a local curvature radius of greater than or equal to 50 percent of second gap height 332 (discussed further below). Furthermore, for example, second end 318 of third portion 314 and first end 310 of second portion 308 are spaced from one another within a range from axially overlapping one another at a distance of approximately twice the second gap height 332 to having an axial gap between one another with a distance of approximately twice the second gap height 332. Also, for example, the angle between second end 318 of third portion 314 and first end 310 of second portion 308 is within a range from greater than or equal to 0 degrees (such that second end 318 of third portion 314 and first end 310 of second portion 308 are parallel) to less than or equal to 60 degrees. Alternatively, first portion 302, second portion 308, and third portion 314 are other shapes, including, but not limited to, flat, "L" shaped, and "C" shaped.

Furthermore, in this alternate embodiment, particle separator 300 includes a flow member 334 disposed within primary fluid passage 204 between second wall 212 and first portion 302, second portion 308, and third portion 314. Flow member 334 extends axially in a direction defined by primary fluid flow 216 through primary fluid passage 204. Additionally, flow member 334 is disposed within primary fluid passage 204 at a radial distance from first wall 214 within a range from greater than or equal to 20 percent of primary fluid passage radial height to less than or equal to 90 percent of primary fluid passage radial height. Flow member 334 is configured to straighten and/or divide primary fluid flow 216. By creating a more uniform primary fluid flow 216, particle separation efficiency increases at particle separator 300. Flow member 334 is attached to at least one of first wall 214, second wall 212, first portion 302, second portion 308, and third portion 314. In the exemplary embodiment, flow member 334 has a curvature that is substantially similar to the curvature of second wall 212. In alternative embodiments, flow member 334 may have any other shape that allows particle separator 300 to operate as described herein. In other alternative embodiments, particle separator 300 does not include flow member 334.

Figure 7:
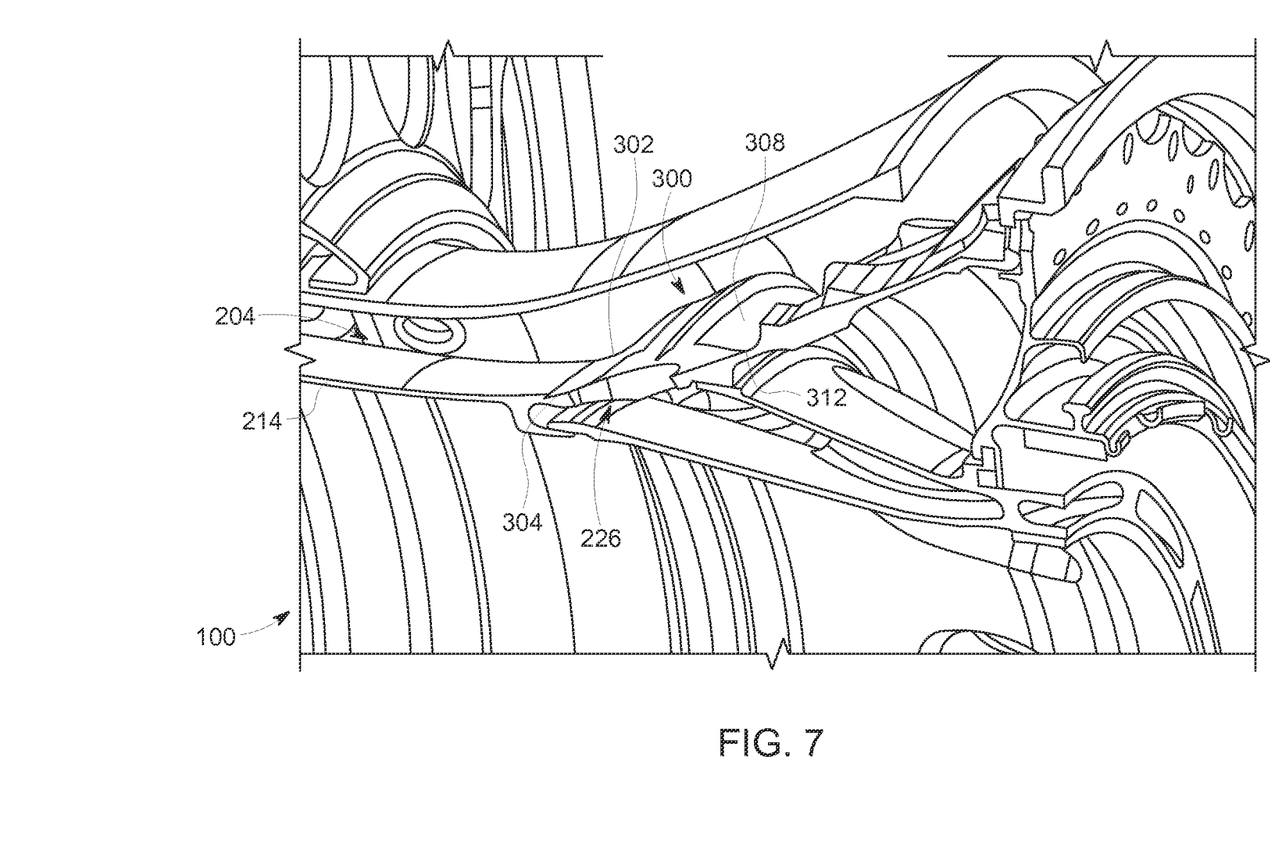
FIG. 7 is a perspective view of the particle separator shown in FIG. 6.

FIG. 7 is a perspective view of particle separator 300 that may be used with turbine engine 100. As described above, particle separator 300 is coupled to first wall 214 at first end 304 of first portion 302 and second end 312 of second portion 308. In this alternative embodiment, first portion 302, second portion 308, and third portion 314 are unitary. In some alternative embodiments, first portion 302, second portion 308, and third portion 314 are separate members that are coupled together. As shown in FIG. 7, particle separator 300 spans substantially circumferentially across primary fluid passage 204 and extends over cooling inlet hole 226. In some alternative embodiments, particle separator 300 is a discrete member that extends over cooling inlet hole 226 only and does not span circumferentially across primary fluid passage 204.

Figure 8:
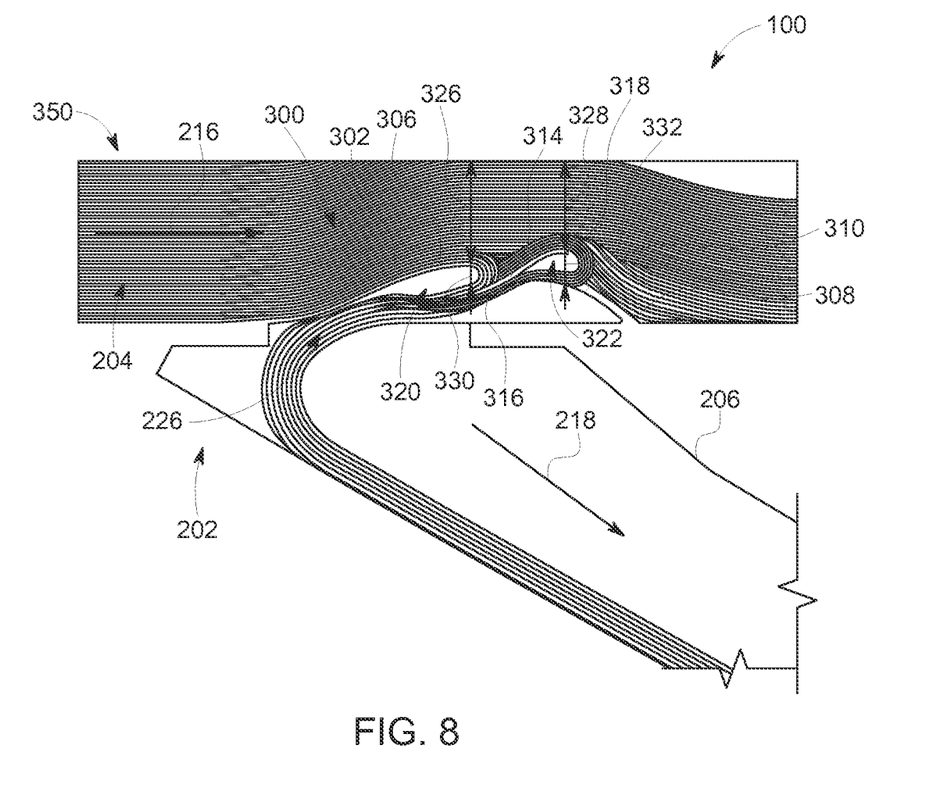
FIG. 8 is a flow characteristic diagram of the particle separator shown in FIG. 6.

FIG. 8 is a flow characteristics diagram 350 of particle separator 300 as described above. Flow characteristic diagram 350 shows particle trajectories within cooling system 202. Particle-laden primary fluid flow 216 is channeled through primary fluid passage 204. Particle separator 300 extends over cooling inlet hole 226 which reduces direct particle entry into auxiliary fluid passage 206 from particle-laden primary fluid flow 216.

Particle entry into auxiliary fluid passage 206 is also reduced by fluid properties created by particle separator 300, similar to the fluid properties discussed above in reference to FIG. 4. First portion 302 and third portion 314 create a ramp-like shape that accelerates particle-laden primary fluid flow 216 in an axial direction by reducing the cross-sectional area of primary fluid passage 204. Additionally, second portion 308 further improves particle separation effectiveness by promoting attached continuous flow. In this alternative embodiment, second portion 308 has a convex fairing downstream. In some alternative embodiments, second portion 308 is any suitable shape that enables operation of particle separator 300 as described herein.

Auxiliary fluid flow 218, which is used for cooling, is diverted from primary fluid flow 216 through first and second fluid diversion passages 320, 322. This diversion forces auxiliary fluid flow 218 to turn approximately 180° around second end 306 of first portion 302 and second end 318 of third portion 314 before entering into auxiliary fluid passage 206. The clear area in FIG. 8 around first and second fluid diversion passages 320, 322 shows that particle entry into auxiliary fluid passage 206 is reduced and auxiliary fluid flow 218, which makes the turns at first and second fluid diversion passages 320, 322, contains fewer particles as shown in FIG. 9, discussed below.

In this alternative embodiment, the fluid passage height affects the amount of flow acceleration through primary fluid passage 204. A first primary fluid passage height 326 defined by second end 306 of first portion 302 and second wall 212. A second primary fluid passage height 328 is defined by second end 318 of third portion 314 and second wall 212. In this alternative embodiment, second primary fluid passage height 328 is less than first primary fluid passage height 326. First and second primary fluid passage heights 326 and 328 have a height within a range from greater than or equal to 10 percent of primary fluid passage radial height to less than or equal to 90 percent of primary fluid passage radial height. In some alternative embodiments, first and second primary fluid passage heights 326, 328 are equal height to one another.

In this alternative embodiment, the fluid diversion passage height affects the particle separation at first and second fluid diversion passages 320, 322. First fluid diversion passage 320 has a first gap height 330 defined by second end 306 of first portion 302 and first end 316 of third portion 314. Second fluid diversion passage 322 has a second gap height 332 defined by second end 318 of third portion 314 and first end 310 of second portion 308. In this alternative embodiment, first gap height 330 is substantially equal to second gap height 332. In some alternative embodiments, first and second gap heights 330, 332 are different from one another.

Figure 9:
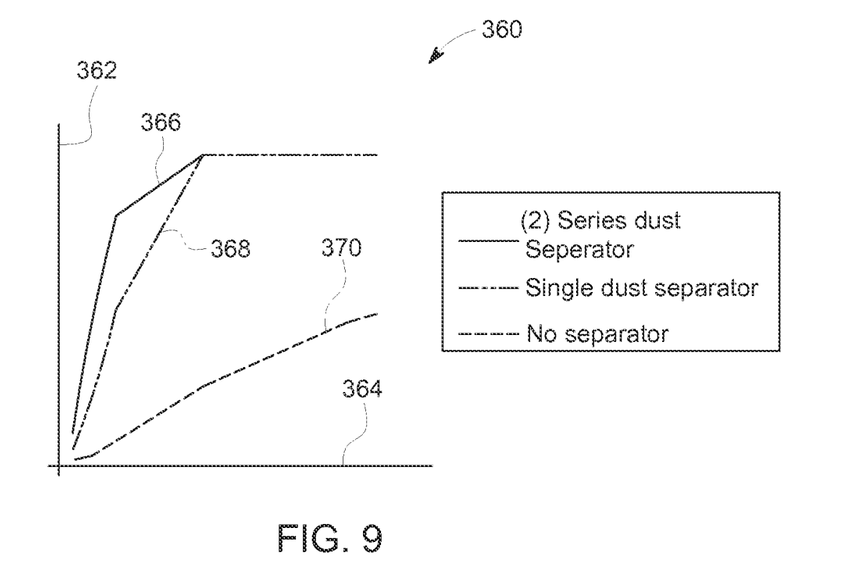
FIG. 9 is a separation graph for the particle separator shown in FIG. 6.

FIG. 9 is a separation graph 360 that includes a y-axis 362 defining efficiency of particle separation from auxiliary fluid flow 218. Graph 360 also includes an x-axis 364 defining a particle size. Graph 360 shows three efficiency of particle separation versus particle size curves for auxiliary fluid flow 218. The uppermost curve 366 is the curve for auxiliary fluid flow 218 with particle separator 300. The middle curve 368 is the curve for auxiliary fluid flow 218 with particle separator 200 as described above in reference to FIGS. 2-5. The lowermost curve 370 is the curve for auxiliary fluid flow 218 without particle separator 300. The higher the efficiency of particle separation, the cleaner the cooling air for the air cooled component.

Figure 10:
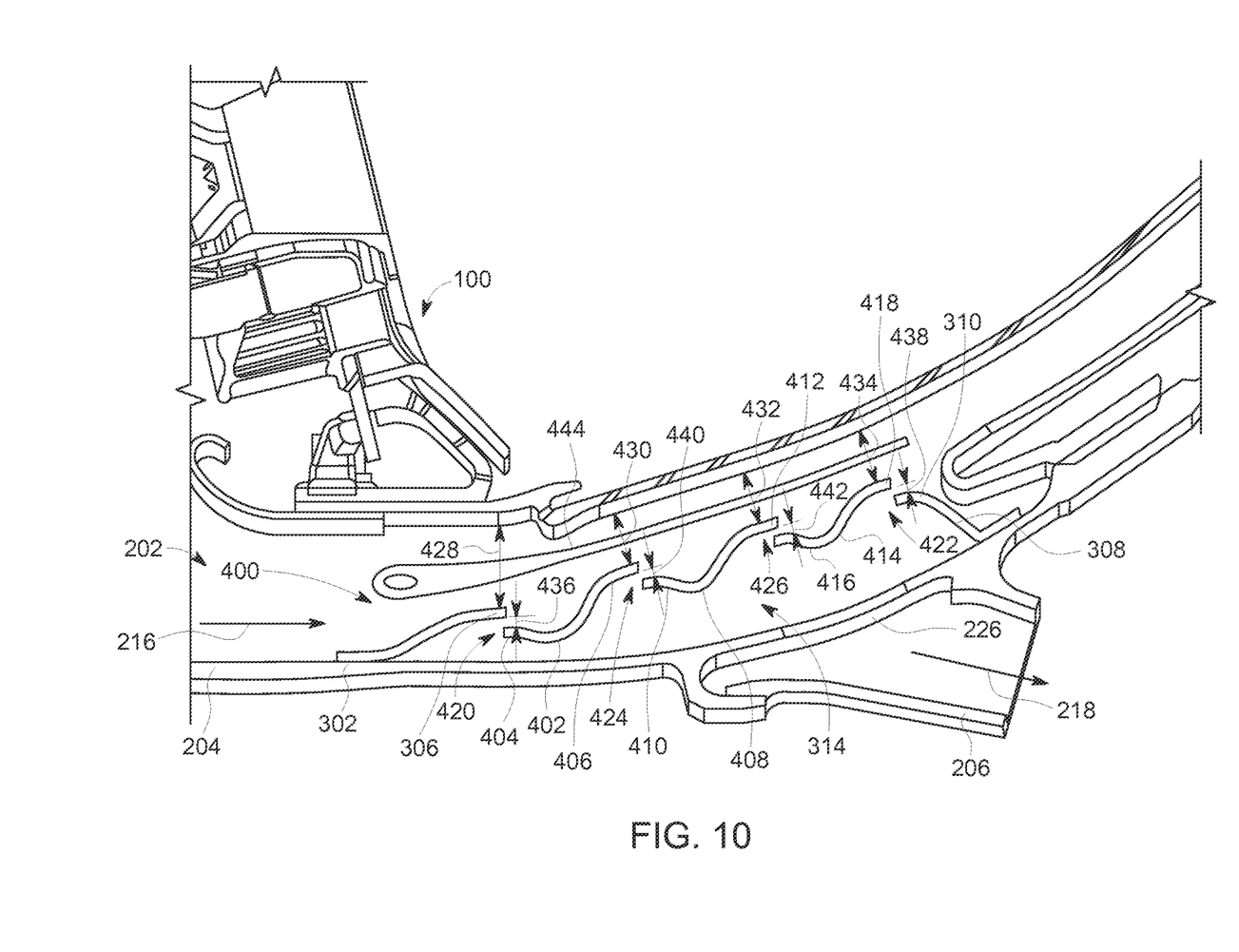
FIG. 10 is a schematic view of another alternative particle separator that may be used with the turbine engine shown in FIG. 1.

FIG. 10 is a schematic view of another alternative particle separator 400 that may be used with turbine engine 100. In this alternative embodiment, turbine engine 100 includes a cooling system 202 that channels cooling air towards the air cooled component as described above in reference to FIG. 2. Additionally, in this alternative embodiment, particle separator 400 includes a first portion 302, a second portion 308, and at least one third portion 314 as described above in reference to FIG. 6.

In this alternative embodiment, at least one third portion 314 further includes a first section 402, a second section 408, and third section 414. First section 402, second section 408, and third section 414 are between first portion 302 and second portion 308 as shown in FIG. 10. First section 402 has a first end 404 and a second end 406 opposite of first end 404. Second section 408 has a first end 410 and second end 412 opposite of first end 410. Third section 414 has a first end 416 and second end 418 opposite of first end 416. First section 402, second section 408, and third section 414 all extend axially in a direction defined by primary fluid flow 216 through primary fluid passage 204.

Also, in this alternative embodiment, first section 402, second section 408, and third section 414 are shown as substantially "S" shaped. For example, first end 404 of first section 402 has a local curvature radius (first curve in the "S") greater than or equal to 10 percent of first section 402 axial length, and second end 406 of first section 402 has a local curvature radius (second curve in the "S") greater than or equal to 20 percent of first section 402 axial length. Moreover, for example, second end 406 of first section 402 has a flap angle (end angle curved either towards first wall 214 or second wall 212) within a range from less than or equal to 10 degrees into second wall 212 (such that end angle curves toward second wall 212) to less than or equal to 60 degrees into first wall 214 (such that end angle curves towards first wall 214). The flap angle also has a local curvature radius of greater than or equal to 50 percent of third gap height 440 (discussed further below). Furthermore, for example, second end 406 of first section 402 and first end 410 of second section 408 are spaced from one another within a range from axially overlapping one another at a distance of approximately twice the third gap height 440 to having an axial gap between one another with a distance of approximately twice the third gap height 440. Also, for example, the angle between second end 406 of first section 402 and first end 410 of second section 408 is within a range from greater than or equal to 0 degrees (such that second end 406 of first section 402 and first end 410 of second section 408 are parallel) to less than or equal to 60 degrees. Alternatively, first section 402, second section 408, and third section 414 are other shapes, including, but not limited to, flat, "L" shaped, and "C" shaped. Additionally, in this alternative embodiment at least one third portion 314 is shown with three sections 402, 408, 414. In some alternative embodiments, at least one third portion 314 includes, but not limited to, two, five, and six sections.

Further, in this alternate embodiment, particle separator 400 includes a flow member 444 disposed within primary fluid passage 204 between second wall 212 and first portion 302, second portion 308, and at least one third portion 314. Flow member 444 extends axially in a direction defined by primary fluid flow 216 through primary fluid passage 204. Additionally, flow member 444 is disposed within primary fluid passage 204 at a radial distance from first wall 214 within a range from greater than or equal to 20 percent of primary fluid passage radial height to less than or equal to 90 percent of primary fluid passage radial height. Flow member 444 is configured to straighten and/or divide primary fluid flow 216. By creating a more uniform primary fluid flow 216, particle separation efficiency increases at particle separator 400. Flow member 444 is attached to at least one of first wall 214, second wall 212, first portion 302, second portion 308, and at least one third portion 314. In the exemplary embodiment, flow member 444 has a curvature that is substantially similar to the curvature of second wall 212. In alternative embodiments, flow member 444 may have any other shape that allows particle separator 400 to operate as described herein. In other alternative embodiments, particle separator 400 does not include flow member 444.

Additionally, in this alternative embodiment, first section 402, second section 408, and third section 414 are unitarily coupled to first portion 302 and second portion 308. In some alternative embodiments, first section 402, second section 408, and third section 414 are unitary. In yet some other alternative embodiments, first section 402, second section 408, and third section 414 are separate members that are coupled together. Particle separator 400 spans substantially circumferentially across primary fluid passage 204 and extending over cooling inlet hole 226. In some alternative embodiments, particle separator 400 is a discrete member that extending over cooling inlet hole 226 only and does not span circumferentially across primary fluid passage 204.

Moreover, in this alternative embodiment, at least one first fluid diversion passage 420 is defined by second end 306 of first portion 302 and first end 404 of first section 402. At least one second fluid diversion passage 422 is defined by second end 418 of third section 414 and first end 310 of second portion 308. At least one third fluid diversion passage 424 is defined by second end 406 of first section 402 and first end 410 of second section 408. At least one fourth fluid diversion passage 426 is defined by second end 412 of second section 408 and first end 416 of third section 414. First, second, third, and fourth fluid diversion passages 420, 422, 424, 426 are coupled in flow communication with primary fluid passage 204 and auxiliary fluid passage 206. First, second, third, and fourth fluid diversion passages 420, 422, 424, 426 divert fluid from primary fluid passage 204 to auxiliary fluid passage 206 in a direction that is opposed to primary fluid flow 216 through primary fluid passage 204.

In addition, in this alternative embodiment, a first primary fluid passage height 428 is defined by second end 306 of first portion 302 and second wall 212. A second primary fluid passage height 430 is defined by second end 406 of first section 402. A third primary fluid passage height 432 is defined by second end 412 of second section 408. A fourth primary fluid passage height 434 is defined by second end 418 of third section 414. In this alternative embodiment, second primary fluid passage height 430 is less than first primary fluid passage height 428, third primary fluid passage height 432 is less than second primary fluid passage height 430, and fourth primary fluid passage height 434 is less than third primary fluid passage height 432. First, second, third, and fourth primary fluid passage heights 428, 430, 432, and 434 have a height within a range from greater than or equal to 10 percent of primary fluid passage radial height to less than or equal to 90 percent of primary fluid passage height. In some alternative embodiments, first, second, third, and fourth fluid passage heights 428, 430, 432, 434 are of equal height to one another. Similar to particle separator 300 described above in reference to FIGS. 6-9, particle separator 400 accelerates particle-laden primary fluid flow 216 in an axial direction by reducing the cross-section area of primary fluid passage 204.

Also, in this alternative embodiment, first fluid diversion passage 420 has a first gap height 436 defined by second end 306 of first portion 302 and first end 404 of first section 402. Second fluid diversion passage 422 has a second gap height 438 defined by second end 418 of third section 414 and first end 310 of second portion 308. Third fluid diversion passage 424 has a third gap height 440 defined by second end 406 of first section 402 and first end 410 of second section 408. Fourth fluid diversion passage 426 has a fourth gap height 442 defined by second end 412 of second section 408 and first end 416 of third section 414. In this alternative embodiment, first gap height 436 is substantially equal to second gap height 438. First gap height 436 is also substantially equal to third gap height 440 and fourth gap height 442. In some alternative embodiments, first, second, third, and fourth gap heights 436, 438, 440, 442 are different from one another.

Similar to particle separator 300 described above in reference to FIGS. 6-9, particle-laden auxiliary fluid flow 218 turns approximately 180° about first, second, third, and fourth fluid diversion passages 420, 422, 424, 426 before entering into auxiliary fluid passage 206. The turns at first, second, third, and fourth fluid diversion passages 420, 422, 424, 426 separates heavier particles from auxiliary fluid flow 218. The heavier particles stay within primary fluid flow 216 and continue through primary fluid passage 204.

Figure 11:
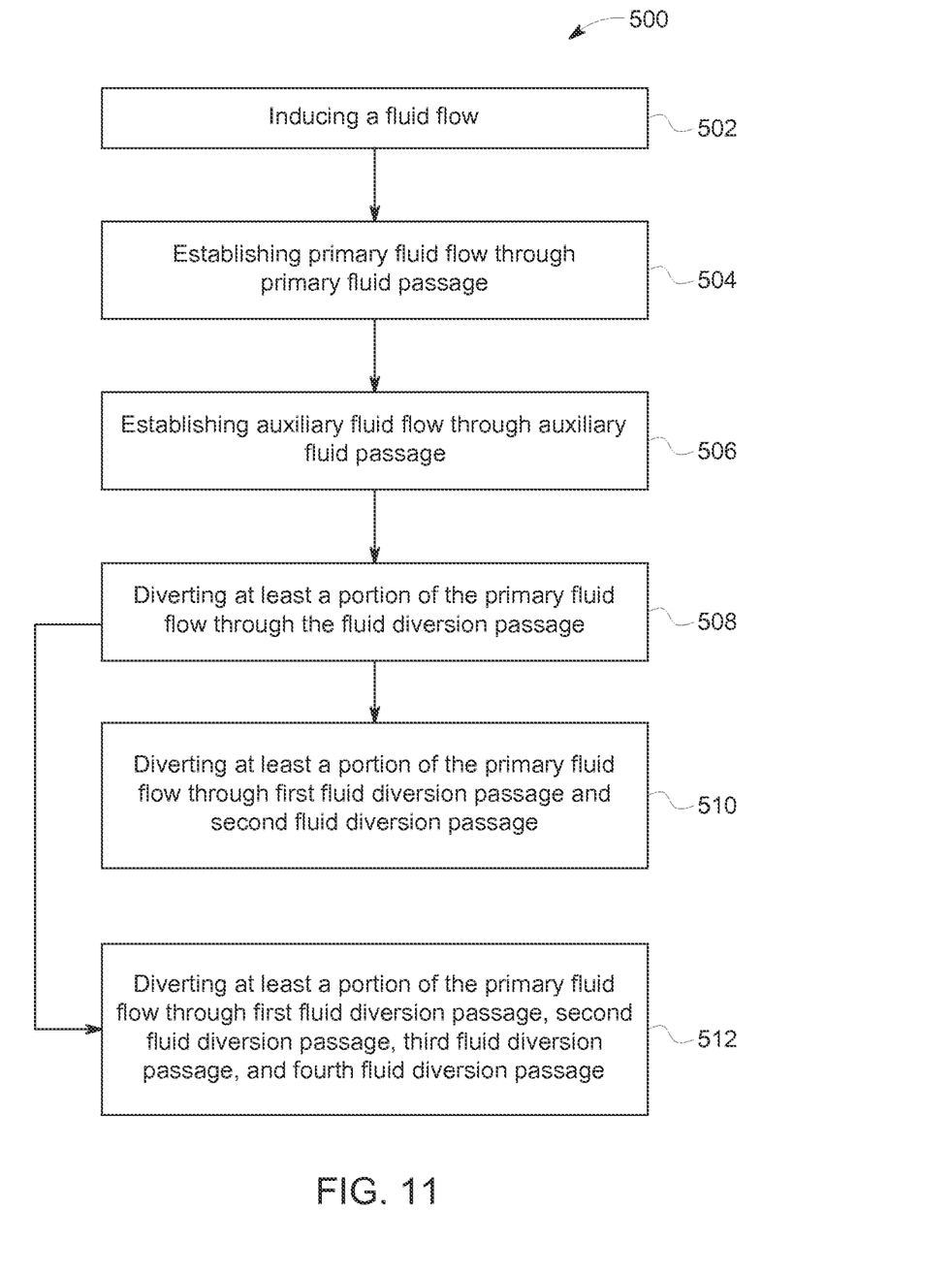
FIG. 11 is a flow diagram for an exemplary method of enhancing particle removal from a fluid flow in the turbine engine shown in FIG. 1.

An exemplary method 500 of enhancing particle removal from a fluid flow in turbine engine 100 (shown in FIG. 1) is illustrated in the flow diagram of FIG. 11. With reference to FIGS. 1-10, method 500 includes inducing 502 a fluid flow in turbine engine 100. Method 500 further includes establishing 504 primary fluid flow 216 through primary fluid passage 204. Also, method 500 includes establishing 506 auxiliary fluid flow 218 through auxiliary fluid passage 206. Establishing 506 auxiliary fluid flow 218 includes diverting 508 a portion of primary fluid flow 216 through fluid diversion passage 228 such that fluid diversion passage 228 diverts the fluid flow from primary fluid passage 204 to auxiliary fluid passage 206 in a direction opposed to the direction of fluid flow through primary fluid passage 204.

In alternative embodiments, fluid diversion passage 228 is first fluid diversion passage 320 and establishing 506 auxiliary fluid flow 218 includes diverting 510 a portion of primary fluid flow 216 through first fluid diversion passage 320 and second fluid diversion passage 322 such that first fluid diversion passage 320 and second fluid diversion passage 322 diverts the fluid flow from primary fluid passage 204 to auxiliary fluid passage 206 in a direction opposed to the direction of fluid flow through primary fluid passage 204.

In other alternative embodiments, establishing 506 auxiliary fluid flow 218 includes diverting 512 a portion of primary fluid flow 216 through first fluid diversion passage 420, second fluid diversion passage 422, third fluid diversion passage 424, and fourth fluid diversion passage 426 such that first fluid diversion passage 420, second fluid diversion passage 422, third fluid diversion passage 424, and fourth fluid diversion passage 426 diverts the fluid flow from primary fluid passage 204 to auxiliary fluid passage 206 in a direction opposed to the direction of fluid flow through primary fluid passage 204.

Particle separating devices described herein provide a cost-effective method for reducing sand particles and/or particulate matter within cooling systems of turbomachines. Specifically, in order to reduce particles within the cooling system, the particle separators described herein utilize the difference in inertia between particles and air molecules as a separation mechanism. The particle separator is located over a cooling air extraction hole serving as a particle shield such that particles are restricted from directly entering the cooling passage. Additionally, the particle separator modifies a cross-sectional area of a flow passage, accelerating particle-laden flow therein. Cooling air is routed through a fluid diversion passage within the particle separator. Particle-laden flow has to turn approximately 180° at the fluid diversion passage such that particles with higher inertia are separated and carried downstream. As such, the amount of particles traveling into the cooling passage is substantially decreased. The particle separators described herein offer advantages that include, without limitation, cost effective implementation and retro fit application. Additionally, the particle separators described herein, have a lower weight than many known particle separators, thereby reducing any weight penalties in an aircraft engine retrofit. Moreover, use of the particle separators describe herein maintain the effectiveness of cooling systems within turbomachines by reducing particle accumulation around small features such as rims, film cooling holes, and turbulators, which extends engine component service life, and reduces engine downtime and maintenance costs.

Exemplary embodiments of methods, systems, and apparatus for operating turbomachines are not limited to the specific embodiments described herein, but rather, components of systems and/or steps of the methods may be utilized independently and separately from other components and/or steps described herein. For example, the methods, systems, and apparatus may also be used in combination with other systems requiring reducing particles in a fluid flow, and the associated methods, and are not limited to practice with only the systems and methods as described herein. Rather, the exemplary embodiment can be implemented and utilized in connection with many other applications, equipment, and systems that may benefit from separating particles in a fluid flow.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A particle separator for a turbomachine, the turbomachine including a first wall and a second wall at least partially defining at least one primary fluid passage, the first wall further defining at least one auxiliary fluid passage, said particle separator comprising:
   first ramp comprising a first end and a second end opposite said first end, said first end coupled to the first wall, said second end extending from the first wall into the at least one primary fluid passage and extending in a direction at least partially defined by a direction of fluid flow through the at least one primary fluid passage, wherein said second end and the first wall at least partially define at least one fluid diversion passage coupled in flow communication with the at least one primary fluid passage and the at least one auxiliary fluid passage, said at least one fluid diversion passage configured to divert fluid from the at least one primary fluid passage to the at least one auxiliary fluid passage in a direction at least partially opposed to the direction of fluid flow through the at least one primary fluid passage;
   a fairing;
   at least one second ramp; and
   a flow diverter extending axially in a direction defined by the fluid flow through the at least one primary fluid passage, said flow diverter disposed radially between the second wall and at least one of said first ramp, said fairing, and said at least one second ramp.

2. The particle separator in accordance with claim 1, wherein the at least one fluid diversion passage is at least one first fluid diversion passage, said fairing comprising a first end and a second end opposite said first end, said second end of said fairing coupled to the first wall, and said first end of said fairing extending from the first wall into the at least one primary fluid passage, said at least one second ramp extending in a direction at least partially defined by the direction of fluid flow through the at least one primary fluid passage, said at least one second ramp positioned between said first ramp and said fairing, wherein said first ramp and said at least one second ramp at least partially define said at least one first fluid diversion passage, and said at least one second ramp and said fairing at least partially define at least one second fluid diversion passage coupled in flow communication with the at least one primary fluid passage and the at least one auxiliary fluid passage.

3. The particle separator in accordance with claim 2, wherein said second end of said first ramp and the second wall at least partially define a first primary fluid passage height, said at least one second ramp comprises:
   a first section comprising a first end and a second end opposite said first end, said second end of said first section and the second wall at least partially define a second primary fluid passage height;
   a second section comprising a first end and a second end opposite said first end, said second end of said second section and the second wall at least partially define a third primary fluid passage height; and
   a third section comprising a first end and a second end opposite said first end, said second end of said third section and the second wall at least partially define a fourth primary fluid passage height, wherein said second primary fluid passage height is less than said first primary fluid passage height, said third primary fluid passage height is less than said second primary fluid passage height, and said fourth primary fluid passage height is less than said third primary fluid passage height.

4. The particle separator in accordance with claim 3, wherein said at least one first fluid diversion passage is at least partially defined by said second end of said first ramp and said first end of said first section and said at least one second fluid diversion passage is at least partially defined by said second end of said third section and said first end of said fairing, said particle separator further comprising:
   at least one third fluid diversion passage coupled in flow communication with the at least one primary fluid passage and the at least one auxiliary fluid passage at least partially defined by said second end of said first section and said first end of said second section; and
   at least one fourth fluid diversion passage coupled in flow communication with the at least one primary fluid passage and the at least one auxiliary fluid passage at least partially defined by said second end of said second section and said first end of said third section, wherein said at least one first fluid diversion passage has a first gap height, said at least one second fluid diversion passage has a second gap height substantially equal to said first gap height, said at least one third fluid diversion passage has a third gap height substantially equal to said first gap height, and said at least one fourth fluid diversion passage has a fourth gap height substantially equal to said first gap height.

5. The particle separator in accordance with claim 3, wherein said first ramp, said fairing, and said at least one second ramp are unitary.

6. The particle separator in accordance with claim 3, further comprising a support device comprising a coupling member and a plurality of support members coupled to said coupling member, said coupling member coupled to the first wall, said plurality of support members extending from the first wall into the at least one primary fluid passage, and said plurality of support members coupled to said second end of said first ramp, wherein the second ramp comprises four sections.

7. The particle separator in accordance with claim 6, wherein the second ramp comprises five sections.

8. The particle separator in accordance with claim 7, wherein the second ramp comprises six sections.

9. The particle separator in accordance with claim 3 further comprising:
  at least one third fluid diversion passage coupled in flow communication with the at least one primary fluid passage and the at least one auxiliary fluid passage at least partially defined by said second end of said first section and said first end of said second section; and
  at least one fourth fluid diversion passage coupled in flow communication with the at least one primary fluid passage and the at least one auxiliary fluid passage at least partially defined by said second end of said second section and said first end of said third section.

10. The particle separator in accordance with claim 1, wherein said fairing comprises a first end and a second end opposite said first end, said second end of said fairing coupled to the first wall, and said first end of said fairing extending from the first wall into the at least one primary fluid passage, and wherein said at least one second ramp extends in a direction at least partially defined by the direction of fluid flow through the at least one primary fluid passage, the at least one second ramp further comprising:
  a first section comprising a first end and a second end opposite said first end;
  a second section comprising a first end and a second end opposite said first end; and
  a third section comprising a first end and a second end opposite said first end,
  wherein each of the first section, the second section and the third section are substantially S-shaped.

11. A turbomachine comprising:
  a compressor;
  a turbine rotatably coupled to said compressor;
  a combustor coupled in flow communication with said compressor and said turbine;
  a combustor bypass system comprising a first wall and a second wall at least partially defining at least one primary fluid passage, said first wall further defining at least one auxiliary fluid passage; and
  a particle separator comprising;
  a first ramp comprising a first end and a second end opposite said first end, said first end coupled to said first wall, said second end extending from said first wall into said at least one primary fluid passage and extending in a direction at least partially defined by a direction of fluid flow through said at least one primary fluid passage, wherein said second end and said first wall at least partially define at least one fluid diversion passage coupled in flow communication with said at least one primary fluid passage and said at least one auxiliary fluid passage, and said at least one fluid diversion passage configured to divert fluid from said at least one primary fluid passage to said at least one auxiliary fluid passage in a direction that is at least partially opposed to the direction of fluid flow through said at least one primary fluid passage;
  a fairing;
  at least one second ramp; and
  a flow diverter extending axially in a direction defined by the fluid flow through at least one primary fluid passage, said flow diverter disposed radially between the second wall and at least one of said first ramp, said fairing, and said at least one second ramp.

12. The turbomachine in accordance with claim 11, wherein said at least one fluid diversion passage is at least one first fluid diversion passage, said fairing comprising a first end and a second end opposite said first end, said second end of said fairing coupled to said first wall, and said first end of said fairing extending from said first wall into said at least one primary fluid passage, said at least one second ramp extending in a direction at least partially defined by the direction of fluid flow through said at least one primary fluid passage, said at least one second ramp positioned between said first ramp and said fairing, wherein said first ramp and said at least one second ramp at least partially define said at least one first fluid diversion passage, and said at least one second ramp and said fairing at least partially define at least one second fluid diversion passage coupled in flow communication with said at least one primary fluid passage and said at least one auxiliary fluid passage.

13. The turbomachine in accordance with claim 12, wherein said second end of said first ramp and said second wall at least partially define a first primary fluid passage height, said at least one second ramp comprises:
  a first section comprising a first end and a second end opposite said first end, said second end of said first section and said second wall at least partially define a second primary fluid passage height;
  a second section comprising a first end and a second end opposite said first end, said second end of said second section and said second wall at least partially define a third primary fluid passage height; and
  a third section comprising a first end and a second end opposite said first end, said second end of said third section and said second wall at least partially define a fourth primary fluid passage height, wherein said second primary fluid passage height is less than said first primary fluid passage height, said third primary fluid passage height is less than said second primary fluid passage height, and said fourth primary fluid passage height is less than said third primary fluid passage height.

14. A particle separator for a turbomachine, the turbomachine including a first wall and a second wall at least partially defining at least one primary fluid passage, the first wall further defining at least one auxiliary fluid passage, said particle separator comprising:
  a first portion comprising a first end and a second end opposite said first end, said first end coupled to the first wall, said second end extending from the first wall into the at least one primary fluid passage and extending in a direction at least partially defined by a direction of fluid flow through the at least one primary fluid passage, wherein said second end and the first wall at least partially define at least one first fluid diversion passage coupled in flow communication with the at least one primary fluid passage and the at least one auxiliary fluid passage, said at least one first fluid diversion passage configured to divert fluid from the at least one primary fluid passage to the at least one auxiliary fluid passage in a direction at least partially opposed to the direction of fluid flow through the at least one primary fluid passage, wherein said second end of said first portion and the second wall at least partially define a first primary fluid passage height;

a second portion comprising a first end and a second end opposite said first end, said second end of said second portion coupled to the first wall, and said first end of said second portion extending from the first wall into the at least one primary fluid passage; and at least one third portion extending in a direction at least partially defined by the direction of fluid flow through the at least one primary fluid passage, said at least one third portion positioned between said first portion and said second portion, wherein said first portion and said at least one third portion at least partially define said at least one first fluid diversion passage, and said at least one third portion and said second portion at least partially define at least one second fluid diversion passage coupled in flow communication with the at least one primary fluid passage and the at least one auxiliary fluid passage, said at least one third portion comprises:

a first section comprising a first end and a second end opposite said first end, said second end of said first section and the second wall at least partially define a second primary fluid passage height;

a second section comprising a first end and a second end opposite said first end, said second end of said second section and the second wall at least partially define a third primary fluid passage height; and a third section comprising a first end and a second end opposite said first end, said second end of said third section and the second wall at least partially define a fourth primary fluid passage height, wherein said second primary fluid passage height is less than said first primary fluid passage height, said third primary fluid passage height is less than said second primary fluid passage height, and said fourth primary fluid passage height is less than said third primary fluid passage height, wherein each of the first section, the second section and the third section are substantially S-shaped.

15. The particle separator in accordance with claim 14, wherein the first end of the first section has a local curvature radius greater than or equal to 10 percent of a first section axial length.

16. The particle separator in accordance with claim 14, wherein the second end of the first section has a local curvature radius greater than or equal to 20 percent of a first section axial length.

17. The particle separator in accordance with claim 14, wherein the second end of the first section has a flap angle within a range from less than or equal to 10 degrees from the second wall to less than or equal to 60 degrees from the first wall.

18. The particle separator in accordance with claim 14 further comprising a flow member extending axially in a direction defined by primary fluid flow.

19. The particle separator in accordance with claim 18, wherein the flow member is disposed between the second wall and at least one of the first portion, the second portion, and the third portion.

20. The particle separator in accordance with claim 14 further comprising at least one first fluid diversion passage defined between the second end of first portion and the first end of the first section.

* * * * *